United States Patent [19]

McDonald

[11] Patent Number: 5,137,193

[45] Date of Patent: Aug. 11, 1992

[54] COVERT AIR-TO-GROUND CARGO RECOVERY SYSTEM

[75] Inventor: Richard K. McDonald, Bellevue, Wash.

[73] Assignee: The Boeing Company, Seattle, Wash.

[21] Appl. No.: 537,054

[22] Filed: Jun. 12, 1990

[51] Int. Cl.⁵ .................................................. B64D 1/00
[52] U.S. Cl. .............................. 244/137.1; 244/1 TD; 258/1.2; 258/1.6
[58] Field of Search .................. 244/137.1, 1 TD; 258/1.2, 1.6; 89/1.1

[56] References Cited

U.S. PATENT DOCUMENTS

| | | | |
|---|---|---|---|
| 3,395,880 | 8/1968 | Mulquin | 258/1.2 |
| 3,567,156 | 3/1971 | Bauer | 258/1.2 |

OTHER PUBLICATIONS

Kenneth C. Stoehrmann and John F. Rybicki, "US target designation capabilities at night and in adverse weather", *Military Technology MILTECH* #9 12, 13, 17, 18, 21–22, Sep. 24, 1984.

Maj. Phillip B. Amidon, Maj. Charles M. Westenhoff, Cap. John E. Charlton, "Laser Designation: Opportunities and Challenges", *USAF Fighter Weapons Review*, 5–9, 11, Spring 1986.

Thomas E. Stockton, "Semiconductor Lasers Expand Their Military Applications", *Defense Electronics*, 101, 103–106, 1986.

"Hellfire packs lethal, accurate punch as Army's primary antiarmor weapon", *Defense Systems Review*, 41–47, no date.

Andrew C. Tillman, "Improving the Dragon anti-tank missile", *International Defense Review*, 1519–1521, Nov. 1987.

Ung-Whoon Jun, Kenneth R. Hall, A. George Bennett and Philip D. Bridges, "Optimal Guidance for Airborne Cable Pickup System" *Aerospace Eng. Dept., Miss. State U*, 84–1893, no date.

Jeffrey P. Rhodes, "The Machines of Special Ops", *Air Force Magazine*, 62, 64–67, Aug. 1988.

*Primary Examiner*—Joseph F. Peters, Jr.
*Assistant Examiner*—Anne E. Bidwell
*Attorney, Agent, or Firm*—Seed and Berry

[57] ABSTRACT

A fast-acting, air-to-ground recovery system utilizing a self-propelled projectile which tows a cable towards a net. The cable-towing projectile is launched from a low flying recovery aircraft. Upon contact with the net, the projectile deploys grappling arms which grasp the net. The net is attached to a cargo which is to be recovered. As the aircraft flies over the net, the cable becomes taut while the net and cargo are lifted off the ground and into the air. The cargo is then hauled into the aircraft by a winch.

23 Claims, 5 Drawing Sheets

COVERT AIR-TO-GROUND CARGO RECOVERY SYSTEM

DESCRIPTION

1. Technical Field

The invention relates to apparatus and techniques for recovering cargo on the ground from an aircraft. Specifically, the invention relates to covert techniques for recovering cargo, including downed aircraft pilots, from the ground.

2. Background of the Invention

The aerial pickup of ground objects has been practiced since the first decade of aviation. Several systems and techniques are now available for retrieving payloads of under 1,000 pounds in weight.

For operations which can be executed in daylight, and without concern for hostile forces, helicopters are used to suspend a cable from above the cargo (either human or inanimate). The cable is attached to the cargo and the helicopter moves off with the suspended cargo without having to land.

Certain military missions require recovery of ground personnel and equipment in a covert manner without landing the retrieval aircraft. Recovery must be achieved quickly. Helicopters, which are slow in comparison to fixed-wing aircraft, have not proven successful for this type of covert action. In addition, flight may be required at low altitudes, at night, and in foul weather. Under these conditions, it is extremely difficult for fixed-wing recovery aircraft to attach a hauling cable to a ground object.

Nevertheless, a variety of fixed-wing aircraft recovery techniques have been developed. The most successful covert technique currently available is known as the Fulton-Star system used to recover airmen who have ejected from (or survived a crash in) their aircraft. The downed airman attaches one end of a 300-400 feet line to a helium balloon which suspends the line in the air. The other end of the line is attached to a chest harness on the airman. An aircraft capable of flying at low speeds and low elevation is provided with guidepoles which extend forwardly from the nose of the aircraft in a V-shape. The balloon is located by the aircraft, which then flies directly into the line so as to capture the line between the guide poles. A recovery crewman in the airplane is positioned in an open hatch on the top of the airplane's fuselage to handle the captured line. As the guide poles capture the line, the drag of the balloon against the atmosphere causes the line to fall against the top of the fuselage, and with difficulty into the crewman's hands. The forwardly extending poles are then collapsed so that the line can be worked along the side of the aircraft, where it is brought inside and connected to a winch. All of the above must be achieved before the line becomes taut. The downed airman is then winched up.

In a variation of the above technique, a snare is suspended below the balloon. The snare is captured by a hook trailing from the aircraft.

Neither of the above techniques is well suited for recovery at night or in bad weather. Poor weather conditions and night-time operation make precision steering of the aircraft difficult or impossible, and the whole operation is generally too visible and too time-consuming. Furthermore, the balloon can be deflected by the wind, making it impossible to snare the cable. In addition, the balloon itself and the line are highly visible and may be good radar reflectors. This technique is therefore inappropriate for covert activities because cable and balloon must be deployed for a significant time prior to the arrival of the aircraft, thus divulging the position of the cargo.

In a different approach, referred to as the Long Line Loiter, an aircraft fires an unguided, rocket-propelled harpoon into the ground. A cable attaches the harpoon to the aircraft which then circles the impact site. The cable is attached to the harpoon by a swivel which permits the aircraft to circle the impact site at a height of approximately 500-1,000 feet in a one-half mile diameter circle. A ground crew then attaches the cargo to the harpoon and signals the aircraft that the attachment has been made. Upon receiving the signal from the ground crew, the plane climbs in ever-higher circles until the load is airborne. This technique, although successful, cannot be used at lower altitudes which would entangle the rotating cable with nearby trees. In addition, this technique exposes the aircraft to possible enemy detection for too long a period and is therefore not suitable for covert activities.

A towed, aerodynamically steerable drogue carrying a hook is described in the published literature. This technique addresses some of the problems of the balloon-suspended snare and aircraft tow hook method described above, but introduces other inherent limitations as well. In the towed drogue technique, a cargo carrying trapeze is supported above the ground by a pole. The trapeze also supports a homing beacon. The drogue has a television camera at its forward end and aerodynamic steering vanes at its rearward end. The drogue is connected by a long cable mounted ahead of the drogue's center of gravity to a fixed-wing aircraft. An operator in the aircraft views the beacon through the television camera on the drogue, and actively steers the drogue towards the trapeze. The drogue is equipped with a number of radially extending hooks which then snare the trapeze. This technique advantageously allows the trapeze to be suspended just above treetop level rather than at an altitude of 400-500 feet as in the balloon method. However, the drogue itself is susceptible to crosswinds (which may be severe in bad weather) because the drogue must be fully deployed from the aircraft at a down range distance of at least one-half mile. This also exposes the drogue and cable which descends from the aircraft (both of which may be good radar reflectors) to interrogating radar beams for an unacceptably long time period. This technique is therefore also unsuitable for covert activities. The drogue must fly substantially parallel to the ground for a significant distance to allow the operator to line up the drogue with the trapeze. Thus, this system can only be employed in areas of relatively clear ground (i.e., non-mountainous terrain) which has a large clear area. This technique also suffers from some obvious safety problems caused by objects such as power lines, which may snag the cable and which may be invisible to the television camera.

In view of the above, a need exists for an air-to-ground recovery system which can be deployed from a fixed-wing aircraft flying at relatively low altitudes and relatively high speeds. The system must be capable of functioning under adverse weather conditions without the need for hazardous near ground maneuvers or precision flying tactics. The technique should not expose the aircraft, the cargo, or radar reflective surfaces to long exposure times which are counter-productive to the covert nature of the activity. Finally, the system should be capable of acquiring and pulling out the cargo from a small space, such as a forest clearing.

SUMMARY OF THE INVENTION

It is therefore an object of the present invention to provide an air-to-ground recovery system suitable for covert cargo recovery.

It is also an object of the invention to provide an air-to-ground cargo recovery system which permits the aircraft to quickly descend to a low deployment altitude, snare the cargo, and clear the cargo from a small, clear, pickup area.

It is yet another object of the present invention to achieve the above objects without imposing heavy workloads upon the ground and air crews.

The invention achieves these objects, and other objects and advantages, which will become apparent from the description which follows, by providing covert recovery system, including a self-propelled projectile connected to a long cable. The projectile homes in on a small net suspended above the ground. The cargo to be retrieved is attached to this net. The projectile has a steering mechanism which is cooperatively engaged with the projectile's homing ability to direct the projectile into the net. Upon contact with the net, the projectile grabs the net and the cable is hauled into the aircraft, thus retrieving the cargo. The projectile can be launched from a fixed-wing aircraft travelling at a relatively high speed and at relatively low elevations. In addition, once launched, the projectile can acquire the net in a few seconds. As a result thereof, neither the ground crew nor the aircraft crew are exposed for long periods during recovery operations, making this technique well suited for covert activities.

In its preferred embodiment, the self-propelled projectile of the inventive system includes deployable grappling arms which remain in a folded condition during the flight of the projectile. The arms are released for extension when sensors indicate that the projectile has passed through the net. In this embodiment, the long cable is also connected to the grappling arms, and the cable and grappling arms detach from the main body of the projectile after the arms have been deployed. The projectile body is thus not recovered with the net and cargo so as to reduce haul in weight and the hazards associated with hot engine parts. A hoist within the recovery aircraft is employed to pay in the cable and cargo after the grappling arms have captured the net. A specialized pulley at the end of the hoist may be employed to facilitate recovery of the grappling and net bundle over the end of the hoist. In addition, the hoist can support multiple launch tubes for multiple projectiles, so that the cable can be transferred from one projectile to another in the event of a projectile misfire.

DETAILED DESCRIPTION OF THE INVENTION

Figures 1, 1A:
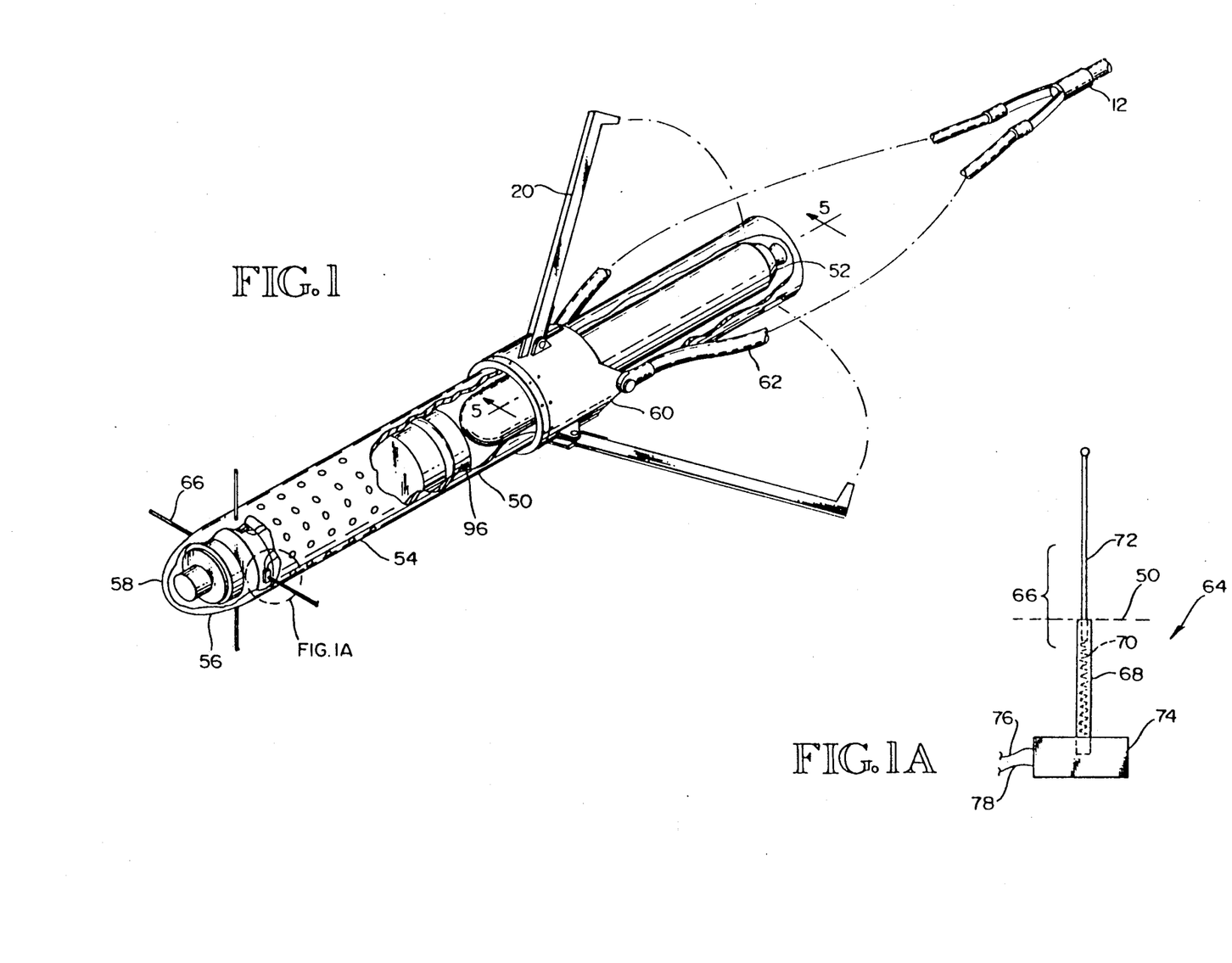
FIG. 1 is an isometric view of a projectile employed in the air-to-ground cargo recovery system of the present invention.
FIG. 1a is an enlarged, schematic representation of a net contact sensor shown in the circled area of FIG. 1.
Figure 2:
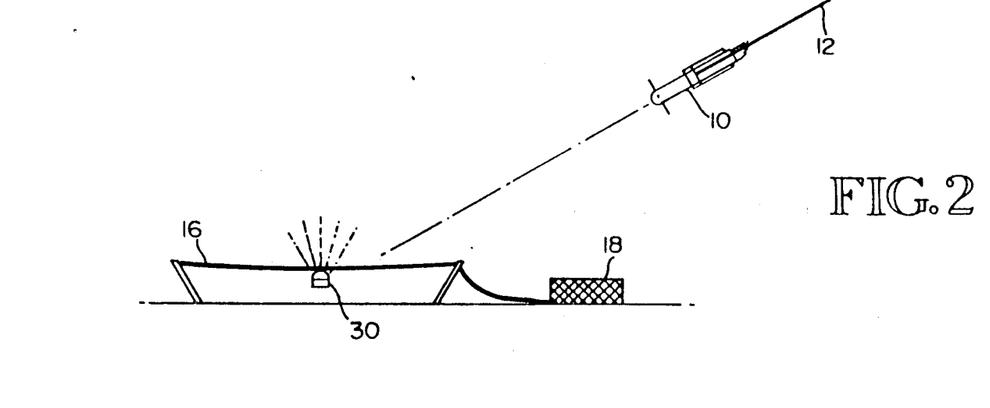
FIG. 2 is a schematic representation of the projectile homing in on a recovery net of the present invention.
Figure 6:
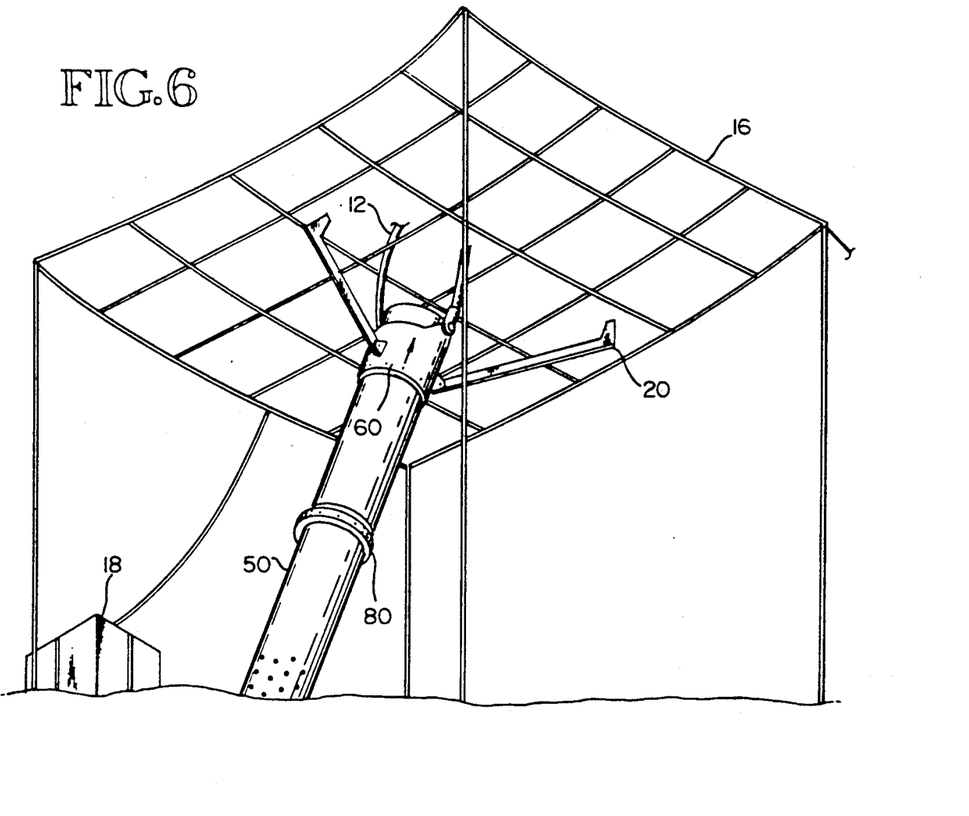
FIG. 6 is an isometric view showing the grappling arms capturing the net.

A self-propelled, cable towing projectile for use with the covert air-to-ground cargo recovery system of the present invention is generally indicated at reference numeral 10 in FIG. 1. The projectile tows a cable 12 which is connected to a hoist, generally indicated at reference numeral 14 in FIG. 3. The projectile is guided to a net 16 as shown in FIG. 2. The net is connected to cargo 18 which is to be recovered into the recovery aircraft 15. As best seen in FIG. 6, after passing through the net 16, grappling arms 20 are deployed to grasp the net 16 before the cable 12 is tensioned to recover the cargo. As the recovery aircraft 15 passes overhead, the cable 12 becomes tensioned and the net and attached cargo 18 lift-off from the ground.

Figure 4:
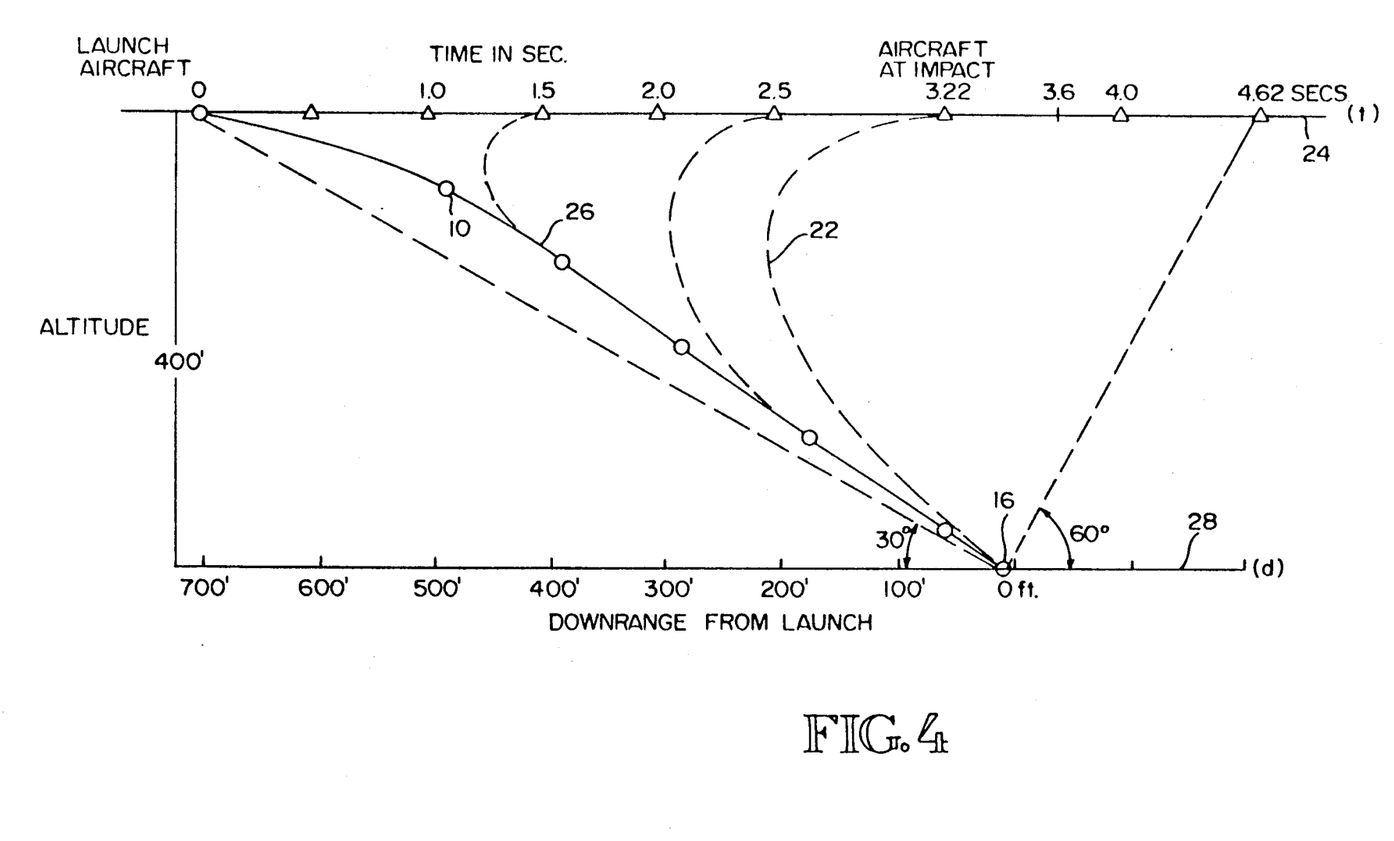
FIG. 4 is a graph representing the correlations between downrange distance, time, and altitude during a typical recovery operation using the system.

The above described apparatus and technique are well suited for recovering cargo 18 during covert operations. A graphic representation of a typical cargo recovery procedure is illustrated in FIG. 4. Dashed line 22 represents the position of the cable 12 at various time intervals which are displayed on upper horizontal axis 24. A solid line 26 represents the projectile's trajectory from time T=0 at the left hand origin of upper axis 24 (T=0 represents the time at which the projectile 10 is launched from the aircraft 15) until the projectile contacts the net 16 approximately at time T=3.22 seconds. A lower horizontal axis 28 represents the downrange distance (in feet) of the projectile and aircraft from the net 16. The example shown in FIG. 4 illustrates a cargo recovering maneuver accomplished at an altitude of approximately 400 feet.

As stated above, at time T=0 (represented by a circle on axis 24), the aircraft (represented by a series of triangles on axis 24) acquires an infrared signal emanating from a beacon 30 (best shown in FIG. 2) suspended beneath the net 16 and visible from above. A suitable beacon is a battery powered laser diode transmitter, model 629, manufactured by the Ferranti Co., operating at a pulse rate of approximately 20 pulses/sec. The beacon is equipped with a lens to spread the laser light into a half-sphere. The beacon signal is originally acquired by the aircraft, which can employ a target acquisition system such as manufactured under the name PAVE PENNEY (AN/AAS-35V) by the Martin Marietta Co., Orlando, Fla. After acquisition, the aircraft adjusts its heading to approximately overfly the target. At a downrange distance of approximately 700 feet and an altitude of approximately 400 feet above terrain, the beacon 30 and net 16 will be approximately 30° below the horizon. The hoist 14 of the recovery aircraft 15 (see FIG. 3) has been previously moved to a launch position, so that a launch tube 32 points the projectile 10 at a generally downward angle of 30° to the aircraft in the general direction of the net. The hoist 14 preferably carries two launch tubes (each with projectile) so that if the first one of the projectiles 10 fails, the cable 12 can be reattached to a second one of the projectiles, and another pass made to acquire the net 16 and beacon 30. Each launch tube opens in half as a clam shell to facilitate loading and removal of projectiles.

As will be explained more fully below, the projectile 10 is self-propelled by means of a rocket motor, steering mechanism and on-board, autonomous guidance system so as to bring the projectile into contact with the net in about 3.2-3.6 seconds. The hoist 14 is incapable of paying out cable quickly enough to keep up with the projectile. Therefore, approximately 400-500 feet of cable is paid out in the form of coiled loops ahead of a main winch 34 shown in FIG. 3, but behind an end roller 36, so that the drag of the main winch does not impeded the flight of the projectile. As shown in FIG. 4, the result is that after launch, the aircraft 15 and projectile 10 move ahead of the main body of the deployed cable at approximately time T=1.5 seconds. At the moment of projectile impact (roughly at time T=3.22 seconds to T=3.6 seconds) a substantial amount of slack exists in the cable 12 (represented by dashed line 22 in FIG. 4) which has been drawn out of the aircraft by the projectile. Cable 12 will not become tensioned until the aircraft is approximately 200 feet uprange from the point of impact.

During the period from time T=3.22 seconds to T=4.62 seconds, the grappling arms 20 are deployed to capture the net 16, and the line 22 will become gradually tensioned. The preferred cable 12 is manufactured from nylon or Kevlar ®. Nylon cable has an elongation of 3.6% before failure, which desirably reduces the instantaneous acceleration experienced by the cargo 18 at lift-off. The preferred cable diameter is approximately 0.65 inch to 1.0 inch, depending on the weight of the cargo 18. Whatever cable is used, the winch 34 controls lift-off acceleration forces by initially unwinding more cable at approximately time T=4.62 sec. under heaving braking and then reeling in the total deployed cable at an acceptable rate. An acceptable maximum lift-off acceleration is approximately four times the acceleration due to gravity or less.

The net 16 can be suspended at various heights above the ground 28 on FIG. 4 to enable cargo recovery in clearings having various areas and various surrounding tree heights. Aircraft approaches with projectile launchings as low as 250 feet are possible. At this aircraft altitude, a beacon suspended 10 feet off the ground in a clearing having a radius of 150 feet, with a surrounding tree height of approximately 30 feet will come into line of sight in a downrange distance of approximately 1,800 feet. If the aircraft is traveling at the preferred speed of 210 ft/sec., the aircraft 15 will pass over the net 16 and beacon 30 in approximately 8.57 seconds. Thus, the projectile should be launched as soon as the target is acquired (allowing 3 seconds for this step) at a distance of around 1,150 feet so that the aircraft is passing over the net at the same time the projectile contacts the net. This provides for sufficient slack in the cable 12 (represented by dashed line 22 in FIG. 4) so as to maintain maximum accelerations on the cargo 18 below acceptable levels.

Figure 5:
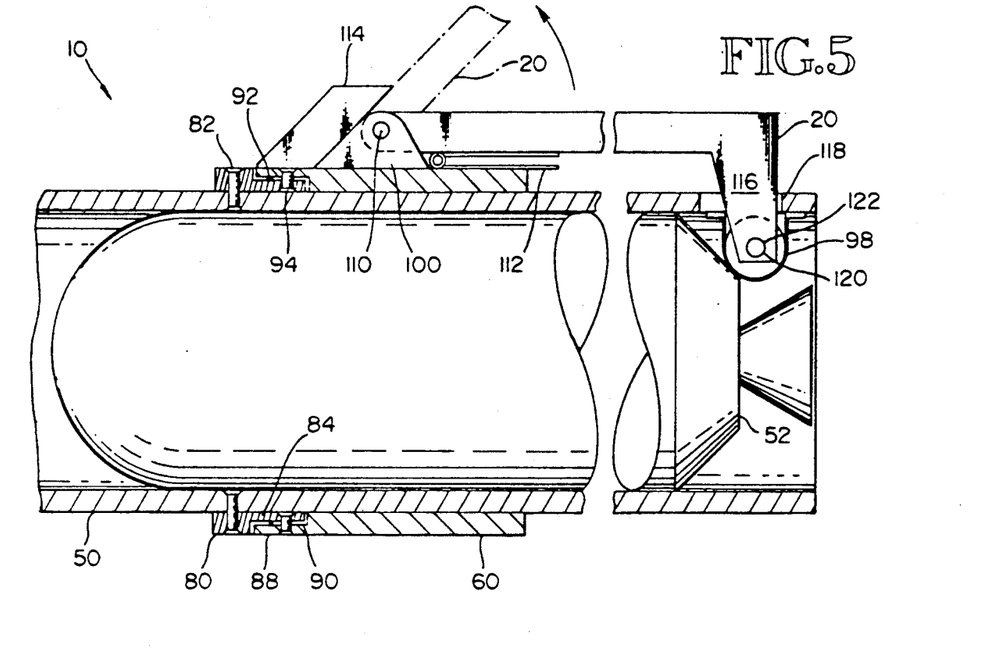
FIG. 5 is an enlarged, sectional side elevational view of a grappling arm deployment mechanism used with the present invention.

Further details of the projectile construction are shown in FIGS. 1, 1a, and 5. The projectile has a main body 50 which contains a single-stage rocket motor 52 incorporating 12.3 pounds of solid propellant. A set of vector-steering rockets 54 respond to commands from a terminal guidance system 56. The terminal guidance system is contained in an infrared transparent dome 58 which forms the nose of the main body 50. The main body also supports a removeable collar 60 to which is attached the grappling arms 20 and a cable yoke 62 which connects the cable 12 to the collar 60 behind the center of gravity of the main body 50. By transferring aerodynamic cable drag from the cable 12 to the main body 50 behind the center of gravity of the main body, the projectile is inherently stabilized against pitch and yaw because the thrust generated by the rocket motor 52 passes through the center of gravity of the main body.

A suitable vector steering rocket assembly 54 can be purchased from the McDonnell Douglas Astronautics Co., St. Louis, Mo. The steering rockets should have a time constant of less than approximately twenty-two msec. for full thrust to overcome the pitch and yaw stabilizing effect of cable 12. This vector-steering rocket system is designed to cooperate with the terminal guidance system 56. A laser spot homing tracker developed for anti-tank missiles, currently available from either the Rockwell International Missile Systems Division, Columbus Ohio, or the Martin-Marietta Corp., Orlando, Fla., is suitable for the terminal guidance system 56 and includes a set of gyroscopes to provide target line of sight angular rate data for the steering rockets 54. This laser spot homing tracker is designed to detect electromagnetic radiation having wavelengths in the range of 1-2 micrometers. The light-emitting diode laser beacon 30 manufactured by the Ferranti Co. operates in this range.

The main body 50 of the self-propelled, cable-towing projectile 10 is also provided with transducers generally indicated at reference numeral 64 in FIG. 1a, for determining when the projectile 10 encounters the net 16. This information is used to deploy the grappling arms 20 from their folded position shown in FIG. 2 (and in solid lines in FIG. 5), to their deployed position (shown in FIG. 6, and in dashed lines in FIG. 5), and to alert by way of signal wires embedded in cable 12, the crew of the recovery aircraft 15 to begin hauling in the cable with the main winch 34.

As best seen in FIG. 1a, the transducers 64 include a telescoping antenna 66 having a tubular base portion 68. The base portion contains a coiled spring 70 and an extendible portion 72 which is shown extended after launch in the figures. The base section 68 is fitted with a set of piezoelectric crystals supported by block 74 which generates an electrical signal when the antennas 66 contact the net 16 or the ground 38. As shown in FIG. 1, four of the transducers are distributed around the periphery of the main body 50 aft of the infrared transparent dome 58 and terminal guidance system 56.

The extendible sections 72 of the telescoping antennas 66 are retained in their stowed position by a sabot (not shown) which surrounds the projectile while the projectile is retained in the launch tube 32 on the winch 14. A small charge ejects the sabot and projectile from the launch tube 32 at the instant of launch. The sabot falls away when the rocket motor 52 is ignited after a five msec. time delay. The extendible sections 72 of the antennas then deploy to the extended position shown in the figures.

As previously stated, the piezoelectric crystals in the block 74 generate voltages which appear on lines 76-78 when the material is compressed by the base portion of the antenna when the antenna strikes the net 16. To pass through the net 16, the main body has a diameter of approximately six inches while the net 16 has a mesh spacing of about 8 inches. The fully telescoped antennas 66 extend approximately 4 inches from the body and will therefore contact a portion of the net as the projectile passes therethrough. As will be described more fully hereinbelow, the voltage generated on the lines 67-78 causes the grapple arms 20 to deploy and the removeable collar 60 to separate from the main body 50 of the projectile 10. A signal is also transmitted through embedded wires in the cable 12 by way of the harness 62 to the recovery aircraft 15 so that the recovery aircraft crew can begin hauling the cable in to the aircraft from the moment of impact.

FIG. 5 best illustrates the structure by which the moveable collar 60 is attached to the main body 50 of the projectile 10. The main body has an annular ring 80 connected thereto by circumferentially disposed rivets 82. The annular ring has a reduced, outside diameter rearwardly directed flange 84 which also surrounds the main body 50. The removeable collar 60 is sized to closely fit about the outer diameter of the main body (which is substantially constant from the moveable collar to the rear end 86) except for a short, forwardly extending enlarged inner diameter portion 88 which overlaps flange 84 so that only a small gap (approximately one millimeter) 90 exists therebetween. This gap is filled with a pyrotechnic material known as primacord, which is detonated by an electrical current passed through wire 92 when separation of the removeable collar 60 from the main body is desired.

The flange 84 is connected to the forwardly extending portion 88 of the separably removeable collar 60 by eight rivets 94 which do not connect the flange 84 with the main body 50. Upon detonation of the primacord material in the gap 90, the eight rivets 94 rupture, thus allowing the collar 60 to slide rearwardly off the main body when the cable 12 is tensioned, as shown in FIG. 6. The current for detonating the primacord material is provided to wire 92 from a battery 96 (shown in FIG. 1) upon signal from the transducer 64 at the forward end of the projectile. At the same time, the battery 96 also energizes solenoids 98 (see FIG. 5) which release the grappling arms 20 from their stowed position to their deployed position.

As previously stated, four grappling arms are provided symmetrically about the axis of the main body 50. The grappling arms are pivotally connected to struts 100, which permit the arms to pivot, as described above. The struts 100 are part of the moveable collar 60. The struts 100 and collar 60 are preferably formed as a unit from aluminum, such as by a casting process. The grappling arms are pivotally connected to the struts by pivot pins 110. The grappling arms are biased moved to the extended position (shown by dotted lines in FIG. 5) through the urging of leaf springs 112 which are positioned between the grappling arms and the moveable collar 60. A back stop 114 is provided forwardly of each struts 100 to limit the deployed position of the grappling arms at a preferred open angle of approximately 60°. The grappling arms themselves are approximately 12 inches long, manufactured from highstrength steel, and have inwardly directed ends 116. The ends penetrate apertures 118 at the aft end of the main body 50. Solenoids 98 are located beneath and beside the apertures 118 within the main body 50 so that plungers 120 from the solenoids can engage corresponding holes 122 in the ends 116 of the arms 20. The solenoids thus maintain the grappling arms in their stowed position until the transducers 64 signal that the net has been encountered.

Although premature deployment of the arms is undesirable, such premature deployment may not necessarily cause the mission to fail as the arms are capable of folding against their spring bias so as to pass through the apertures in the net 16. However, premature decoupling of the moveable collar 60 from the projectile main body 50 will result in an aborted mission. For this reason, the transducers 64 are provided with threshold voltage detector circuitry (not shown) which only electrically connects the battery 96 to the primacord material in the gap 90 when the antenna 66 has encountered substantial resistance, such as that caused by contact with the net or the ground. Thus, insubstantial resistance encountered by the antenna (such as that caused by wind resistance) will not release the solenoids or release the collar 10. This is easily achieved as the piezoelectric/ceramic material 74 generates a voltage which is proportional to the deformation of the material over a certain range. Thus, electrical signals generated on lines 76, 78, which may be due to wind resistance, are rejected by the voltage threshold detection circuitry and the battery 96 will not be prematurely connected with the wire 92 in the primacord material.

Figure 3:
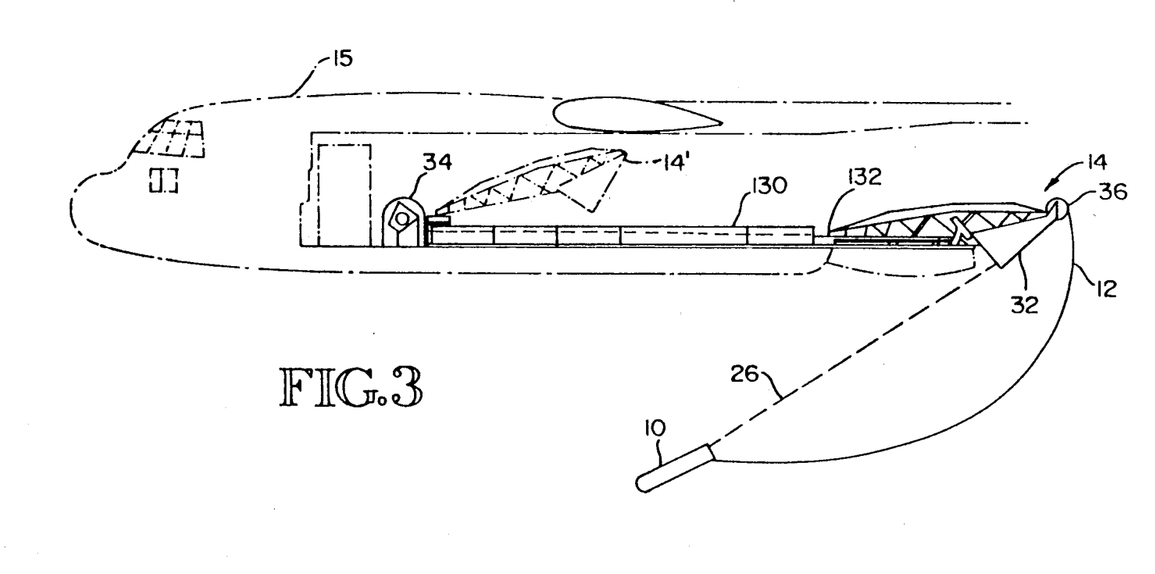
FIG. 3 is a side elevational, schematic representation of the recovery aircraft just prior to, and during launching of the projectile.
Figure 7:
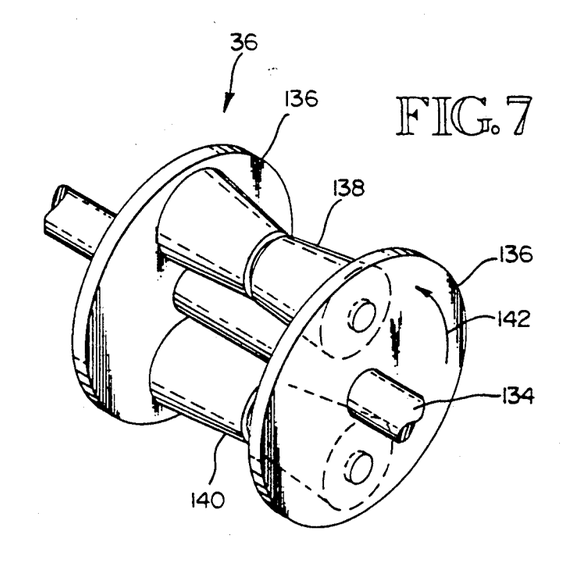
FIG. 7 is an isometric view of a pulley mechanism which facilitates recovery of the net and grappling arms into the recovery aircraft.

Operation of the recovery equipment within the recovery aircraft 15 is best understood by reference to FIG. 3. Prior to launching of the projectile 10 from the aircraft 15, the hoist 14 moves on a track 130 from dashed line position 14' to the launch position shown in solid lines. Once contact with the net is made (as indicated by the signal generated from the transducer 64), the main winch 34 is activated to reel in the cable 12, collar 60, with grappling arms 20, net 16, and attached cargo 18. A suitable main winch and hoist are manufactured by the All American Engineering Co., Wilmington, Del., under model number 90B. The hoist is modified with the provision of an end roller 36 which is best seen in FIG. 7. This modified end roller facilitates passing the awkwardly shaped bundle of the deployed grappling arms 20 and net mass 16 over the end of the hoist 14 so that the cargo 18 can be brought up adjacent to the end pulley 36. Once the net/grapple arm mass has passed over the end roller 36 and the cargo 18 is against pulley 36, the hoist itself can then be elevated about axis 132, and the hoist moved back to its starting position 14' to fully bring the cargo 18 within the recovery aircraft 15. As best seen in FIG. 7, the end roller 36 rotates about a main axle 134 which is selectively rotatable by a motor (not shown). Two circular plates 136 are journaled for rotation with the main axle. The plates are spaced apart at a distance of approximately 12 inches. Two pairs of rollers 138, 140 are journaled for rotation with respect to the circular plates 136 about axes which are substantially parallel to the main axle 134. The pairs of rollers 138, 140 are positioned radially near the perimeter of the circular plates. These rollers are free floating and permit the cable 12 to be drawn over them during normal winching operations during which shaft 134 is locked against rotation. The rollers 138, 140 are preferably tapered so as to have a larger diameter adjacent to the circular plates 136 while tapering to a smaller diameter at a plane midway between the circular plates. This tapered structure tends to guide the cable 12 to the center of the pulley 36. Once all of the cable has been paid in by the main winch, the grapple/net mass will be adjacent to the lower set of rollers 140. These rollers do not have a sufficient diameter to allow the grapple/net mass to be easily pulled over the axle 134. Therefore, the axle is driven so as to rotate the plates 136 in the direction of arrow 142 while the cable is slowly hauled in by the main winch. As the entire pulley 36 rotates, the rollers grab portions of the grapple/net mass and pass each section in a "hand-overhand" fashion past the main axle until the cargo 18 is adjacent to the pulley. At this time, the crew will retract the hoist on the track 130 to the dotted line position 14' in FIG. 3 to complete the recovery operation.

Other embodiments and variations of the invention are also contemplated. For example, the projectile 10 could be provided with steerable vanes in the exhaust of the rocket motor 52 to direct the projectile rather than such action being provided by the vector steering rockets 54. A suitable steering vane system is available from the Santa Barbara Co. of Spain. In addition, rather than launching the projectile from a tube, and encasing the projectile sabot, the launcher could also comprise an open 3-rail assembly which positions the guide rails against the collar 60 between the grappling arms 20. Furthermore, a television system employing a fiber optic cable along the length of the cable 12 could be employed which would allow an operator in the aircraft to steer the missile towards the beacon 30 under the net 16. Further yet, rather than providing piezoelectric materials in the transducers 64 for determining net contact, the telescoping antenna could be connected to mechanically biased switches which would prevent the contacts from prematurely closing as the antenna reacted against air pressure due to the projectile's possessive motion through the air. Upon reviewing this disclosure, other variations will become apparent to those of ordinary skill in the art. Therefore, the invention is not to be limited by the above description, but is to be determined in scope by the claims which follow.

I claim:

1. A fast-acting, air-to-ground projectile for capturing a suspended net or net-like structure which is part of a cargo recovery system, comprising:
    an elongated projectile body having a forward end, a rearward end and a center of gravity located therebetween, and self-propulsion means for propelling the body from a low-flying aircraft towards a net-like structure;
    a long cable having a first end attached to the body rearwardly of the center of gravity, and having a second end adapted for connection to a recovery aircraft;
    grasping means connected to the body for grasping the net-like structure;
    a homing sensor carried by the body for determining the direction of a signal emanating from the immediate vicinity of the net-like structure; and
    steering means, operatively interconnected with the homing sensor for directing the body towards the net-like structure so that the projectile contacts the net-like structure and engages the grasping means with the net-like structure, whereby reeling in the second end of the cable recovers the net-like structure and any cargo attached thereto.

2. The projectile of claim 1 wherein the grasping means has a plurality of deployable arms, moveable from a stowed position with respect to the body to a deployed position extended from the body, and wherein the body has net sensor means for determining if the projectile has penetrated the net-like structure, the body also having actuator means, operatively interconnected with the deployable arms and the net sensor means for deploying the arms to the extended position when the net sensor means determines that the projectile has penetrated the net-like structure.

3. The projectile of claim 2 wherein the first end of the cable and the deployable arms are connected to a collar which is removeably coupled to the projectile body, and wherein the body has decoupling means, operatively interconnected with the net sensor means, for decoupling the collar from the body when the net sensor means determines that the projectile has penetrated the net-like structure so that the body is not recovered with the cable, net and any cargo.

4. The projectile of claim 3 wherein the net sensor means has a spring biased, telescoping antenna having a first end connected to a motion transducer and a second end moveable from a stowed position within the body to a deployed position extending from the body for contacting the net-like structure.

5. The projectile of claim 4 wherein the motion transducer is a piezoelectric crystal.

6. The projectile of claim 3 wherein the self-propulsion means is a rocket motor.

7. The projectile of claim 1 wherein the steering means includes reaction thrusters.

8. The projectile of claim 1 including a homing sensor carried by the body for determining the direction of a modulated signal emanating from the immediate vicinity of the net-like structure wherein the steering means is operatively interconnected with the homing sensor.

9. The projectile of claim 8 wherein the homing sensor includes an electromagnetic radiation detector.

10. The projectile of claim 9 wherein the electromagnetic radiation detector has a maximum sensitivity in the range of approximately one to two micrometers wavelength.

11. A low observability system for recovering cargo on the ground from an aircraft, comprising:
    a net suspended substantially horizontally above the ground and means for attaching the net to cargo to be retrieved; and
    a self-propelled projectile connected to a first end of a long cable, the projectile having steering means for directing the projectile to the net, and grapple means for grasping the net when the projectile contacts the net;
    a hoist in the aircraft having cable handling means, connected to a second end of the cable for paying out and paying in the cable; and
    launching means in the aircraft for launching the projectile therefrom.

12. The cargo recovery system of claim 11 wherein the grapple means has a plurality of deployable arms, moveable from a stowed position with respect to the projectile to a deployed position extended from the projectile, and wherein the projectile has net sensor means for determining if the projectile has penetrated the net, the projectile also having actuator means, operatively interconnected with the deployable arms and the net sensor means for deploying the arms to the extended position when the net sensor means determines that the projectile has penetrated the net.

13. The cargo recovery system of claim 12 wherein the first end of the cable and the deployable arms are connected to a collar which is removeably coupled to a body of the projectile, and wherein the body has decoupling means, activated by the net sensor means, for decoupling the collar from the body when the net sensor means determines that the projectile has penetrated the net-like structure so that the body is not recovered with the cable, net and any cargo.

14. The cargo recovery system of claim 13 wherein the net sensor means has a spring biased, telescoping antenna having a first end connected to a motion transducer and a second end moveable from a stowed position within the body to a deployed position extending from the body for contacting the net.

15. The cargo recovery system of claim 14 wherein the motion transducer is a piezoelectric crystal.

16. The cargo recovery system of claim 13 wherein the self-propulsion means is a rocket motor.

17. The cargo recovery system of claim 11 wherein the steering means includes reaction thrusters.

18. The cargo recovery system of claim 11 including a beacon positioned with an area circumscribed by the net the beacon having means for transmitting a distinctive signal in a desired direction, wherein the self-propelled projectile also has homing means for determining the direction of the distinctive signal, and wherein the steering means is operatively interconnected with the homing means to direct the projectile to the distinctive signal.

19. The cargo recovery system of claim 11 wherein the hoist has an end pulley having two spaced apart flanges fixed to a rotatably driven shaft, the flanges having two rollers journaled for rotation about two axles positioned substantially parallel to the shaft and near the periphery of the flanges so that the grapple means and net portion captured thereby can be pulled over the pulley.

20. A covert method for quickly recovering cargo on the ground from an aircraft, comprising the steps of:
attaching cargo to a net suspended substantially horizontally above the ground;
placing a beacon substantially in an area circumscribed by the net;
transmitting a distinctive signal from the beacon;
approaching the vicinity of the net with a recovery aircraft at a relatively low altitude and a relatively high speed;
launching a self-propelled projectile from the aircraft towards the net, the projectile having a first end of a cable attached thereto, and grapple means for grasping the net;
retaining a second end of the cable in the aircraft and paying out the cable when the projectile is launched;
guiding the projectile into contact with the net;
connecting the grapple means to the net; and
paying in the cable to retrieve the net and the cargo attached thereto.

21. The cargo recovery method of claim 20 wherein the relatively low altitude is below approximately 400 feet, and wherein the relatively high speed is approximately 210 ft/sec.

22. The cargo recovery method of claim 21 wherein the projectile is launched at a downrange distance of more than approximately 700 feet from the beacon.

23. The cargo recovery method of claim 20 including the steps of placing a beacon in an area substantially circumscribed by the net and transmitting a distinctive signal from the beacon, and directing the projectile towards the beacon.

* * * * *